United States Patent [19]

Klier et al.

[11] Patent Number: 5,430,083
[45] Date of Patent: Jul. 4, 1995

[54] PAINTS AND USE OF THESE PAINTS AS TOPCOATS FOR THE FINISHING OF AUTOMOBILE BODIES

[75] Inventors: Konrad Klier, Den Haag, Netherlands; Peter Betz, Yokohama, Japan

[73] Assignee: BASF Lacke + Farben Aktiengesellschaft, Munster, Germany

[21] Appl. No.: 945,970
[22] PCT Filed: May 6, 1991
[86] PCT No.: PCT/EP91/00852
 § 371 Date: Jan. 4, 1993
 § 102(e) Date: Jan. 4, 1993
[87] PCT Pub. No.: WO91/18954
 PCT Pub. Date: Dec. 12, 1991

[30] Foreign Application Priority Data
 May 26, 1990 [DE] Germany .............. 40 17 075.6

[51] Int. Cl.[6] .................. C09D 201/00; C09D 183/06
[52] U.S. Cl. ............................ 524/265; 524/267; 524/269
[58] Field of Search ............ 524/267, 268, 262, 269; 525/100

[56] References Cited

U.S. PATENT DOCUMENTS

| | | | |
|---|---|---|---|
| 4,774,278 | 9/1988 | Yoshiuka | 524/506 |
| 4,812,518 | 3/1989 | Haubennestel | 525/100 |
| 4,931,492 | 6/1990 | Foster et al. | 524/267 |

FOREIGN PATENT DOCUMENTS

| | | |
|---|---|---|
| 119482 | 9/1984 | European Pat. Off. |
| 329260 | 8/1989 | European Pat. Off. |
| 50202 | 12/1989 | European Pat. Off. |

*Primary Examiner*—Ralph H. Dean
*Attorney, Agent, or Firm*—Anne Gerry Sabourin

[57] ABSTRACT

The invention relates to paints which contain a compound of the general formula (I) or a mixture of compounds of the general formula (I), the general formula (I) being

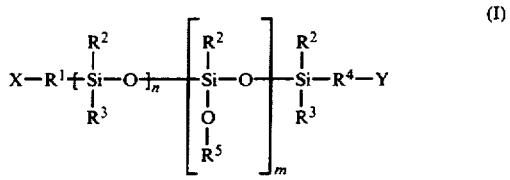

and n, m, X, $R^1$, $R^2$, $R^3$, $R^4$, $R^5$ and Y having the following meaning:

- n stands for a number between 2 and 25, preferably for a number between 5 and 15
- m stands for a number from 0 to 5
- X and Y can be identical or different and stand for a functional group, for example a hydroxyl, amino, carboxyl or NCO group
  - $R^1$ and $R^4$ can be identical or different and stand for an alkylene radical, preferably for an alkylene radical having 1 to 6 carbon atoms, or for an arylene radical, preferably a phenylene radical
- $R^2$ and $R^3$ can be identical or different and stand for an alkyl radical, preferably for an alkyl radical having 1 to 3 carbon atoms, or for an aryl radical, preferably for a phenyl radical
- $R^5$ stands for

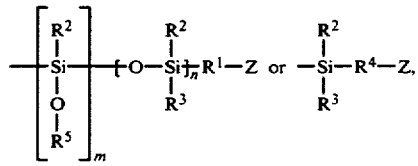

Z standing for X, Y or $R^2$.

Compounds of the general formula (I) improve especially the acid, brush and weather resistances and the water-repellent characteristics of the paint films prepared using these paints.

2 Claims, No Drawings

PAINTS AND USE OF THESE PAINTS AS TOPCOATS FOR THE FINISHING OF AUTOMOBILE BODIES

The invention relates to paints and the use of these paints as topcoats for the finishing of automobile bodies.

Automobile bodies are usually painted with at least an electrocoating paint, a body filler, a metallic or a solid-color basecoat, if required, and a topcoat.

In those cases in which a metallic or a solid-color basecoat has been applied, a clearcoat is applied as topcoat. In all other cases the topcoat consists of a solid-color paint.

Severe demands are made on the topcoat finish of automobile bodies. It should impart to the vehicle as attractive an appearance as possible and at the same time be resistant to external influences.

The object of the present invention is to provide paints, especially clearcoats, which can be used as topcoats for the finishing of automobile bodies and with which it is possible to produce topcoat finishes which possess in comparison with topcoat finishes of the prior art improved characteristics, especially improved acid resistance and/or improved water-repellent characteristics and/or improved weather resistance and/or improved resistance to mechanical stresses incurred in the cleaning of topcoat finishes by brushes (improved "brush resistance").

Surprisingly, this object is achieved by making available paints which contain a compound of the general formula (I) or a mixture of compounds of the general formula (I), the general formula (I) being

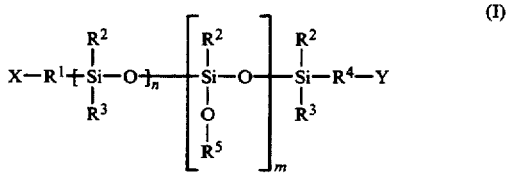

(I)

and n, m, X, $R^1$, $R^2$, $R^3$, $R^4$, $R^5$ and Y having the following meaning:
- n stands for a number between 2 and 25, preferably for a number between 5 and 15
- m stands for a number from 0 to 5
- X and Y can be identical or different and stand for a functional group, for example a hydroxyl, amino, carboxyl or NCO group
- $R^1$ and $R^2$ can be identical or different and stand for an alkylene radical, preferably for an alkylene radical having 1 to 6 carbon atoms, or for an arylene radical, preferably a phenylene radical
- $R^2$ and $R^3$ can be identical or different and stand for an alkyl radical, preferably for an alkyl radical having 1 to 3 carbon atoms, or for an aryl radical, preferably for a phenyl radical
- $R^5$ stands for

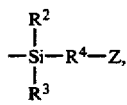

Z standing for X, Y or $R^2$.

Particularly advantageous finishes are provided by paints which contain a compound of the formula

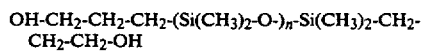

in which n stands for a number between 10 and 14, preferably a number between 11 and 13, particularly preferably for a number between 11.5 and 12.5.

The siloxane compounds used according to the invention are commercially available. Manufacturers of such compounds are, for example, Th. Goldschmidt AG, Efka Chemicals B.V. and Dow Corning Corporation Europe, Brussels.

The siloxane compounds used according to the invention are expediently incorporated in amounts of 0.01 to 4.0, preferably 0.5 to 2.5% by weight or 0.2 to 2.5% by weight, into known paints suitable for the topcoat finishing of automobile bodies, the percentages by weight on the total solids content of 0.01 to 4.0, preferably 0.5 to 2.5% by weight or 0.2 to 2.5% by weight, into known paints suitable for the topcoat finishing of automobile bodies, the percentages by weight being based on the total solids content of binder and crosslinking agent. The paints can be both conventional (i.e. organic solvent-based) and aqueous.

The siloxane compounds used according to the invention are preferably incorporated into paints which comprise a hydroxyl-containing polyacrylate resin or a mixture of hydroxyl-containing polyacrylate resins and/or a hydroxyl-containing polyester resin or a mixture of hydroxyl-containing polyester resins and/or a hydroxyl-containing alkyd resin or a mixture of hydroxyl-containing alkyd resins as binders and an amino resin, preferably a melamine-formaldehyde resin or a mixture of amino resins or a mixture of melamine-formaldehyde resins or a polyisocyanate or a mixture of polyisocyanates as crosslinking agents.

The hydroxyl-containing polyacrylate resins should have a hydroxyl value of 50 to 200, preferably of 70 to 150, an acid value of 0 to 30 and a number average molecular weight of 5000 to 50,000. The hydroxyl-containing polyesters should have a hydroxyl value of 90 to 150, preferably of 70 to 130, an acid value of 10 to 25 and a number average molecular weight of 500 to 3000. the hydroxyl-containing alkyd resins should have a hydroxyl value of 90 to 130 and a number average molecular weight of 1000 to 15,000.

Etherified amino resins or etherified melamine resins are usually used as crosslinking agents when amino resins or melamine resins are used as crosslinking agents. Paints containing amino resins or melamine resins as crosslinking agents are usually used as one-component paints. Aliphatic or cycloaliphatic polyisocyanates are preferably used as crosslinking agents when polyisocyanates are used as crosslinking agents. Paints containing polyisocyanates as crosslinking agents are usually used as two-component paints.

Paints of the type described above are known and are used both for productionlines [sic] and for refinishing. They may comprise all the customary pigments and additives, for example light stabilizers, flow control agents etc. The siloxane compounds used according to the invention are preferably employed in paints which contain no pigments or only transparent pigments (i.e. in clearcoats) to improve the characteristics, in particular to improve the acid resistance and/or brush resistance and/or water-repellent characteristics and/or weather resistance of the paint films produced from these paints.

It has been found, surprisingly, that the siloxane compounds used according to the invention in combination with light stabilizers (in particular light stabilizers based on mixtures of UV absorbers (especially liquid benzotriazoles) and free-radical scavengers of the HALS (hindered amine light stabilizer) type enhance the weather resistance, especially the gloss retention, of clearcoats. To improve the weather resistance, it is expedient to incorporate 0.001 to 3.0, preferably 0.02 to 1.0, % by weight of the siloxane compounds according to the invention into the clearcoats. The light stabilizers or mixtures of various light stabilizers to be used in combination with the siloxane compounds according to the invention may be used in the usual amounts (for example about 3.0 to about 6.0% by weight of a benzotriazole in combination with about 1.0 to about 3.0% by weight of a free-radical scavenger of the HALS type; the percentages by weight are based on the total solids content of binder and crosslinking agent).

The weather resistance of pigmented paints can also be improved with the aid of the siloxane compounds according to the invention. As far as the amounts of siloxane compound and light stabilizers used are concerned, the statements made above are valid.

The invention is elucidated in greater detail by the examples below. All parts and percentages are by weight, unless expressly stated otherwise.

1. Preparation of one-component clearcoats suitable for the topcoat finishing of automobile bodies The compounds listed in the following table are mixed in the amounts stated in the table (in parts by weight).

TABLE 1

| | Paint 1 | Paint 2 | Paint 3 (Comparison) |
|---|---|---|---|
| Luprenal ® 240 S (60% solution in Solvesso 100)[1] | 32.05 | 32.05 | 32.05 |
| Hydroxyl-containing polyacrylate resin (70% solution in solvent naphtha)[2] | 12.0 | 11.3 | 12.7 |
| Luwipal ® 010 (56% solution in butanol/xylene 3:1)[3] | 31.2 | 31.2 | 31.2 |
| Luwipal ® 015 (53% solution in isobutanol)[4] | 5.0 | 5.0 | 5.0 |
| Butanol | 3.0 | 3.0 | 3.0 |
| Solvent naphtha | 1.1 | 1.1 | 1.1 |
| Butyl diglycol | 5.0 | 5.0 | 5.0 |
| Cathaphor ® BLA 100 (50% solution in butanol)[5] | 0.15 | 0.15 | 0.15 |
| Flow control agent[6] | 1.0 | 1.0 | 1.0 |
| Tinuvin ® 1130[7] | 1.5 | 1.5 | 1.5 |
| Tinuvin ® 292[7] | 1.0 | 1.0 | 1.0 |
| Xylene | 6.5 | 6.7 | 6.3 |
| Tegomer ® H-SI 2110 | 0.5 | 1.0 | — |
| | 100.0 | 100.0 | 100.0 |
| Content of Tegomer ® H-SI 2110 in % by weight based on the total solids content of binder and | 1.05 | 2.12 | — |

TABLE 1-continued

| | Paint 1 | Paint 2 | Paint 3 (Comparison) |
|---|---|---|---|
| crosslinking agent | | | |

[1] Hydroxyl-containing polyacrylate resin having an acid value of 8–10 (manufacturer: BASF AG);
[2] Parameters of the polyacrylate resin: acid value: 15–20, OH value: 140;
[3,4] Highly reactive melamine resins for baking paints; manufacturer: BASF AG
[5] Antistat, manufacturer: A.B.M. Chemicals Unity Mills
[6] Silicone oil AR 200 (manufacturer: Wacker Chemie GmbH), 1% solution in xylene/butanol 94:5
[7] Manufacturer: Ciba Geigy
[8] Siloxane compound of the formula: $HO-(CH_2)_3-(Si(CH_3)_2-O)_{12}-Si(CH_3)_2-(CH_2)_3-OH$
Number average molecular weight: 740, OH value: 122; manufacturer: Th. Goldschmidt AG.

The viscosity of the clearcoats prepared according to Table 1 is adjusted to 30 sec. in a Ford No. 4 cup using a mixture of solvent naphtha/xylene/butyl acetate/dipentenes/butyl glycolate 54:12:20:9:5, the clearcoats are sprayed onto a steel panel (Bonder 132) coated with a commercial body filler (dry film thickness 40–50 μm) and with a commercial metallic basecoat and baked for 20 min. at 140° C. The dry film thickness of the basecoat should be 15 to 20 μm and the dry film thickness of the clearcoats should be 40 μm.

The clearcoat films obtained in this manner were tested for their acid resistance and brush resistance. To test acid resistance, 1% sulfuric acid is applied to the clearcoat films. The clearcoat films treated in this manner are then heated for 30 minutes in an oven using temperature gradients. The temperature at which the first signs of etching can be observed is then determined.

The clearcoat film prepared using paint 3 exhibits signs of etching even at temperatures below 38° C., while with the paint films prepared using paints 1 and 2 signs of etching only become visible at 41° C. and 43° C. respectively.

To test the brush resistance, the clearcoat films are subjected to 200 double strokes using a brush normally employed for cleaning automobile topcoat finishes (pressure 1 kg, 25 revolutions/min.). The surface of the clearcoat films was then assessed. The clearcoat film prepared using paint 3 was more affected than the clearcoat films prepared using paints 1 and 2.

To test the water-repellent characteristics, a drop of water is applied to the clearcoat surface. The angle (contact angle) formed by the drop of water with the clearcoat surface is then measured ten seconds after applying the drop of water. A greater contact angle was measured for the clearcoat films prepared using paints 1 and 2 than for the clearcoat film prepared using paint 3.

2. Preparation of two-component clearcoats suitable for the topcoat finishing of automobile bodies The components listed in the following Table 2 are mixed in the amounts (parts by weight) stated in the table to form stock paints.

TABLE 2

| | Stock paint 1 | Stock paint 2 | Stock paint 3 (Comparison) |
|---|---|---|---|
| Hydroxyl-containing polyacrylate resin (60% solution in solvent naphtha/methoxypropyl acetate 35:5)[1] | 86.17 | 85.33 | 87.00 |
| 3-Methoxybutyl acetate | 3.00 | 3.00 | 3.00 |
| Tinuvin ® 1130[2] | 1.50 | 1.50 | 1.50 |
| Tinuvin ® 292[3] | 1.00 | 1.00 | 1.00 |
| Flow control agent (5% solution in xylene/butanol 94:1)[4] | 2.00 | 2.00 | 2.00 |
| Butyl glycolate | 1.00 | 1.00 | 1.00 |

TABLE 2-continued

|  | Stock paint 1 | Stock paint 2 | Stock paint 3 (Comparison) |
|---|---|---|---|
| 1-Methoxy-2-propyl acetate | 2.50 | 2.50 | 2.50 |
| Butyl acetate propyl acetate 35:5)[1] | 2.33 | 2.67 | 2.00 |
| Tegomer ® H-SI 2110[5] | 0.50 | 1.00 | — |

[1] Parameters: acid value: 23–28, OH value: 140

[2]

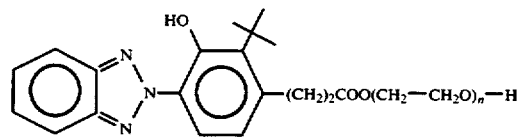

Manufacturer: Ciba Geigy; cf. also footnote[7] to Table 1

[3]

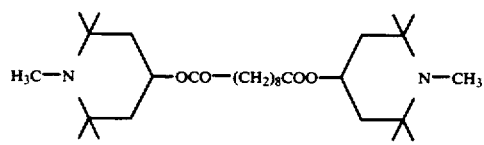

Manufacturer: Ciba Geigy; cf. also footnote[7] to Table 1
[4] Polyether-modified methylpolysiloxane (Baysiloria ® paint additive OL 44)
[5] cf. footnote[8] to Table 1

29.96 (Stock paint 1), 29.93 (Stock paint 2) and 30.00 (Stock paint 3) parts by weight of a solution of Desmodur ® N 3390 (an aliphatic polyisocyanate; manufacturer: Bayer AG) in butyl acetate/solvent naphtha are added to the stock paints prepared according to Table 2. The solution of Desmodur ® N 3390 is prepared by diluting 89 parts by weight of a 90% solution of Desmodur ® N 3390 in butyl acetate/solvent naphtha (1:1) with a further 5.5 parts by weight of butyl acetate and 5.5 parts by weight of solvent naphtha.

(The content of Tegomer ® H-SI 2110 in % by weight, based on the total solids content of binder and crosslinking agent, is 0.66% by weight for paint 1, 1.33% by weight for paint 2 and 0% by weight for paint 3.)

The viscosity of the stock paints mixed with isocyanate in the manner described above is adjusted to 20 sec. in a DIN No. 4 cup using butyl acetate, the stock paints are sprayed onto a steel panel (Bonder 132) coated with a commercial body filler (dry film thickness 40–50 μm) and with a commercial metallic basecoat and baked for 20 min. at 140° C. The dry film thickness of the basecoat should be 15 to 20 μm and the dry film thickness of the clearcoats should be 40 μm.

The clearcoat films obtained in this manner were tested for their acid resistance and brush resistance. To test acid resistance, 1% sulfuric acid is applied to the clearcoat films. The clearcoat films treated in this manner are then heated for 30 min. in an oven using temperature gradients. The temperature at which the first signs of etching can be observed is then determined.

The clearcoat film prepared using paint 3 exhibits signs of etching even at temperatures below 44° C., while with the paint films prepared using paints 1 and 2 signs of etching only become visible at 50° C. and 52° C. respectively.

To test the brush resistance, the clearcoat films are subjected to 200 double strokes using a brush normally employed for cleaning automobile topcoat finishes (pressure 1 kg, 25 revolutions/min.). The surface of the clearcoat films was then assessed. The clearcoat film prepared using paint 3 was more affected than the clearcoat films prepared using paints 1 and 2.

To test the water-repellent characteristics, a drop of water is applied to the clearcoat surface. The angle (contact angle) formed by the drop of water with the clearcoat surface is then measured ten seconds after applying the drop of water. A greater contact angle was measured for the clearcoat films prepared using paints 1 and 2 than for the clearcoat film prepared using paint 3.

To test the weather resistance, the panels coated with the clearcoat films are exposed in a weatherometer (UVCON, ATLAS ELECTRIC, 8 fluorescent lamps, type FS 40 at 40 watt each; light phase 8 hours, dark phase 4 hours; black panel temperature: light phase 70° C., dark phase 50° C.; relative air humidity: light phase: 0%, dark phase 100%). Surprisingly, compared with the clearcoat film prepared using paint 3, the clearcoat films prepared using paints 1 and 2 exhibit improved gloss retention (degree of gloss (20°) after exposure for 1000 hours: paint 1: 73; paint 2: 67; paint 3: 56).

We claim:

1. A paint which comprises a compound of the general formula (I) or a mixture of compounds of the general formula (I), the general formula (I) being

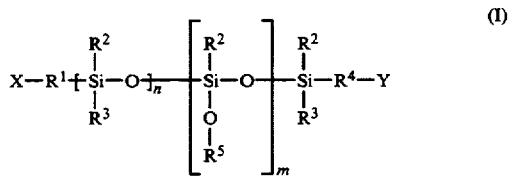

wherein in the general formula (I) n, X, $R^1$, $R^2$, $R^3$, $R^4$ and Y have the following meaning:
- m stands for a number from 0 to 5
- n stands for a number between 11 and 13,
- X and Y both stand for a hydroxyl group
- $R^1$ and $R^4$ both stand for a -$CH_2$-$CH_2$-$CH_2$- group
- $R^2$, and $R^3$ both stand for a methyl group.

2. A paint which comprises a compound of the general formula (I) or a mixture of compounds of the general formula (I), the general formula (I) being

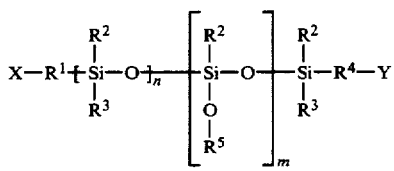 (I)
wherein in the general formula (I) m, n, X, $R^1$, $R^2$, $R^3$, $R^4$ and Y have the following meaning:
- m stands for a number from 0 to 5
- n stands for a number between 11.5 and 12.5,
- X and Y both stand for a hydroxyl group
- $R^1$ and $R^4$ both stand for a -$CH_2$-$CH_2$-$CH_2$- group
- $R^2$ and $R^3$ both stand for a methyl group.
* * * * *